US007823770B2

(12) United States Patent
Brown et al.

(10) Patent No.: US 7,823,770 B2
(45) Date of Patent: Nov. 2, 2010

(54) METHOD AND SYSTEM FOR MAINTAINING CONFIDENTIALITY OF PERSONAL INFORMATION DURING E-COMMERCE TRANSACTIONS

(75) Inventors: Michael Wayne Brown, Georgetown, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/166,589

(22) Filed: Jul. 2, 2008

(65) Prior Publication Data

US 2008/0270258 A1 Oct. 30, 2008

Related U.S. Application Data

(63) Continuation of application No. 09/534,595, filed on Mar. 27, 2000, now Pat. No. 7,409,548.

(51) Int. Cl.
*G06F 7/00* (2006.01)
*G06Q 30/00* (2006.01)
(52) U.S. Cl. .................. 235/376; 235/383; 705/26; 705/342; 713/170
(58) Field of Classification Search ............ 235/375, 235/376, 383, 385; 705/16, 18, 26, 30, 64–69, 705/317, 325, 330, 342; 713/168–170, 182
See application file for complete search history.

(56) References Cited

U.S. PATENT DOCUMENTS

| | | | | |
|---|---|---|---|---|
| 5,781,632 A | * | 7/1998 | Odom | 705/78 |
| 5,790,677 A | * | 8/1998 | Fox et al. | 705/78 |
| 6,047,273 A | * | 4/2000 | Vaghi | 705/410 |
| 6,385,596 B1 | * | 5/2002 | Wiser et al. | 705/51 |
| 6,389,403 B1 | * | 5/2002 | Dorak, Jr. | 705/52 |
| 6,405,203 B1 | * | 6/2002 | Collart | 1/1 |
| 6,430,167 B1 | * | 8/2002 | Falk | 370/325 |
| 6,701,303 B1 | * | 3/2004 | Dunn et al. | 705/75 |
| 6,807,530 B1 | * | 10/2004 | Shub et al. | 705/26 |
| 6,882,979 B1 | * | 4/2005 | Reay et al. | 705/26 |
| 6,996,542 B1 | * | 2/2006 | Landry | 705/40 |
| 2001/0011250 A1 | * | 8/2001 | Paltenghe et al. | 705/41 |
| 2001/0037253 A1 | * | 11/2001 | Kensey | 705/26 |
| 2001/0039535 A1 | * | 11/2001 | Tsiounis et al. | 705/71 |
| 2001/0044787 A1 | * | 11/2001 | Shwartz et al. | 705/78 |

* cited by examiner

*Primary Examiner*—Andrew Joseph Rudy
(74) *Attorney, Agent, or Firm*—Dillon & Yudell LLP (57) ABSTRACT

A method for maintaining confidentiality of personal information during E-commerce transactions. The method includes: (1) compiling a profile of personal information within a depository for at least the buying party to an E-commerce transaction; (2) providing the buying party with a unique identifier linked to his profile for use during subsequent E-commerce transactions; and (3) in response to the buying party providing the identifier to a merchant, completing the E-commerce transaction at the depository without providing any of the buyer's personal information to the merchant.

6 Claims, 10 Drawing Sheets

METHOD AND SYSTEM FOR MAINTAINING CONFIDENTIALITY OF PERSONAL INFORMATION DURING E-COMMERCE TRANSACTIONS

PRIORITY CLAIM

The present application is a continuation of U.S. patent application Ser. No. 09/534,595 titled "Method and System for Maintaining Confidentiality of Personal Information During E-Commerce Transactions," filed on Mar. 27, 2000, the contents of which is incorporated herein by reference in its entirety.

RELATED APPLICATION

The present invention is related to the subject matter of the following commonly assigned, co-pending U.S. patent application, Ser. No. 09/535,559 entitled "Third Party Contract Depository for E-Commerce Transactions," filed concurrently herewith.

BACKGROUND OF THE INVENTION

1. Technical Field

The present invention relates in general to commercial transactions and in particular to commercial transactions on the Internet. Still more particularly, the present invention relates to a method and system for maintaining confidentiality of personal information on the Internet during commercial transactions on the Internet.

2. Description of the Related Art

Internet commerce or E-commerce, as it is commonly referred to in the industry, is quickly becoming a preferred method of conducting commercial transactions. Many traditional and non-traditional businesses have realized the vast potential of conducting business on the Internet and have established web sites by which potential customers or clients may remotely access their respective information or products. This merging of business with the electronic medium of the Internet has thus resulted in an increase in commercial and personal transactions, which occur in a non-tangible medium.

E-commerce transactions may be either point-to-point/bipartite (i.e., an individual communicating directly with another individual or a business web site) or multi-point (i.e., many individuals transacting with each other, as in a swap room, or with on-line auctions, for example). Typically, a web server provides the background within which these E-commerce transactions take place.

Currently, most E-commerce transactions are bipartite and occur between a merchant and a buyer. The merchant is represented online by a web site located on a web server and accessible via a universal resource locator (URL) or web address. The buyer connects to the Internet via one of several known means of connecting to the Internet and accesses the merchant's web site. The merchant and the buyer enter into a transaction within the web server, which is recorded in electronic form on the web server as an agreement (or contract). Thus, the contract is typically stored in the web server of the merchant. A buyer may be provided with the opportunity to print the contract prior to terminating the connection to the web site.

As in traditional commercial transactions, disputes often arise about the actual terms (price, quantity, freight charges, etc.) of a transaction subsequent to the creation of the contract. In the traditional arena, contracts are typically in written form and at least one party has signed the original contract document verifying its authenticity. The terms, as written in this document are difficult, if not impossible, to manipulate without being noticeable once the signature has been affixed to the page.

In the electronic medium of the Internet, electronic documents are generated, which are typically stored on the merchant's web server and are easily modifiable. The electronic nature of the document allows anyone with access to the web server to modify the terms of the original agreement. There is thus an inherent uncertainty in the validity of electronic documents. It is therefore difficult for the buyer or a third party arbitrator to determine the authenticity of the documents when a dispute arises.

Several prior art patents have taught methods for ensuring authenticity of communications/documents on the Internet with the use of digital signatures. U.S. Pat. No. 5,949,876 discloses a system and method for secure transaction management for insuring that information is accessed and utilized only in an authorized way. U.S. Pat. No. 5,850,442 teaches the use of public key infrastructure (i.e., smart token technology) to secure electronic transactions. A third party is utilized to register an application which is held and made accessible to the recipient after signature verification/authentication using a smart token.

Both of these patents use a digital signature, which may be provided to both the buyer and merchant. Use of digital signatures, however, has not been adopted widely by the Internet community, particularly due to associated costs and other logistical concerns, such as the complexity involved in creating the digital signatures and revoking lost or compromised digital signatures.

Another method, which utilizes a third party, has been proposed by United Parcel Services (UPS) OnLine Courier®. This method essentially allows the delivery of secure e-mail via the UPS as a depository third party. The sender sends a document using UPS OnLine Courier. The document is securely uploaded to the secure UPS OnLine Courier server, which sends an e-mail notification to the recipient that there is a document delivery for him. The recipient uses the URL provided in the e-mail to download the document from the secure UPS OnLine Courier server via a Web browser. As an option, the sender may specify that the recipient may only download the file if he has provided a password to the UPS OnLine Courier server, insuring the sender that only the intended recipient may open the document.

Another problem encountered during E-commerce transactions is the loss of or low levels of privacy with respect to distribution of personal information (name, address, email address, etc.) of a buyer. Buyers are usually required to enter personal information into the merchant's web site when conducting a transaction. E-bay, for example, provides multipoint E-commerce transactions; however, E-bay displays the personal information of each visitor who transacts on the site and does not provide for any anonymity/confidentiality. Occasionally, merchants subject their buyers to unsolicited e-mails (referred to as "junk mail") or physical mail, which advertise products of the merchant or another entity to which the merchant has forwarded the buyer's personal information. Also, the buyer may wish to withhold his personal information from the merchant for other reasons.

In some instances, a seller may wish to have his personal information kept private. Currently, anyone may access personal information (such as name and address) about the owner of a web site (i.e., find out to whom a web server belongs) by looking up the domain name in one of the several server databases publicly available through issuers of Internet domain names and affiliated groups.

Prior art attempts to handle this problem includes U.S. Pat. Nos. 5,692,982 and 5,553,145, which disclose the use of a third (trusted) party to transmit an encrypted message from one party to a second party, whereby the identity of the communicating parties may be kept secret (from the third party). A receipt is sent to the sending party when the communication is received by the receiving party. The method also uses a digital signature where each party has a secret signing key and matching public verification key for sending and accessing the content of the communication. Other related patents include U.S. Pat. No. 5,666,420 which utilizes a third party to communicate if a first attempt to communicate directly fails. Chat rooms allow use of pseudonyms during internet communications but do not extend into the internet-based commercial transactions in the context of exchange of financial information.

None of the prior art methods discloses an efficient and globally applicable method for ensuring the confidentiality of personal information of parties to an E-commerce transaction. The present invention thus recognizes that it would be desirable to provide a method and system for providing this functionality (i.e., maintaining confidentiality of personal information during E-commerce transactions) in an efficient and globally applicable manner. A method and system by which a person's personal information is preserved away from the other party in an E-commerce transaction would be a welcomed improvement. These and other benefits are provided in the present invention.

SUMMARY OF THE INVENTION

A method for maintaining confidentiality of personal information during E-commerce transactions is disclosed: The method comprises the steps of: (1) compiling within a depository a profile of personal information of at least first buying party to an E-commerce transaction; (2) providing said first buying party with a unique identifier (ID) linked to the profile for use during subsequent E-commerce transactions; and (3) in response to the first buying party providing the identifier to a second party, completing said transaction without said second party receiving any of said personal information.

The completing step involves initiating a program code within the merchant party's web server, wherein the program code utilizes the ID to locate and interact with the depository via, for example, Transmission Control Protocol/Internet Protocol (TCP/IP). The buying party may be provided with the option of selecting within the merchant party's web server whether or not he wishes to provide his personal information directly to the merchant party or use his ID and the depository.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a method for maintaining privacy of personal information during E-commerce transactions. The invention is described with reference to a commercial transaction involving a merchant and a buyer. Use of these terms are not meant to be restrictive on the invention as other types of commercial and non-commercial transactions, which may occur on the Internet between two parties and result in the generation of an electronic document, are contemplated. For the purposes of this invention, the term merchant, seller and web site or web server are utilized interchangeably to refer to one party to a transaction, whether an individual or a corporation, who has an accessible site on the Internet at which another party may enter into a transaction. Buyer or client refers to the other party to a transaction. The term document as utilized herein may refer to a simple sales receipt or a more complex contract or agreement. Finally, all communication and transactions occur within the electronic medium (i.e., Internet) unless stated otherwise.

Figure 1:
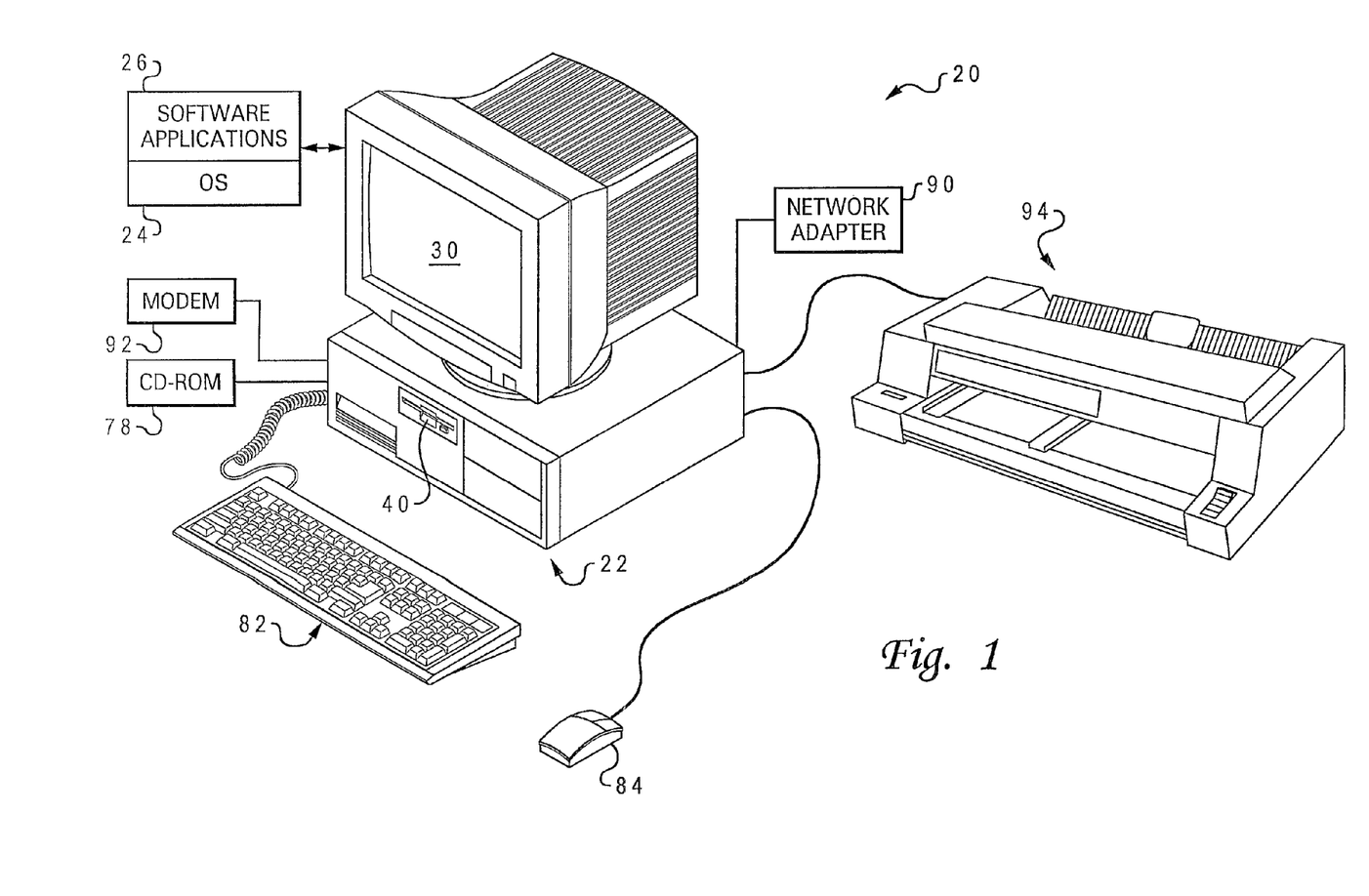
FIG. 1 depicts a data processing system, in which a preferred embodiment of the present invention may be implemented.

With reference now to the figures and in particular with reference to FIG. 1, a data processing system that may be utilized as a buyer's terminal or server on the Internet is presented. Data processing system 20 comprises a Central Processing Unit (CPU) housed in a system unit 22. System unit 22 also provides connections for various hardware components including disk drives 40, and memory devices (not shown). Stored within memory devices are the operating system (OS) and software applications by which many of the processes of the invention are implemented as will become clear later. Several peripheral input/output devices are connected to the CPU. These input/output devices include keyboard 82, mouse 84, printer 94, CD-ROM 78, and display monitor 30. Display monitor 30 provides a graphical user interface (GUI) which allows a user to view and interact with software applications 26 stored in system memory or provided via a network, by displaying icons or other selectable mechanisms with which the user may interact.

Figure 2:
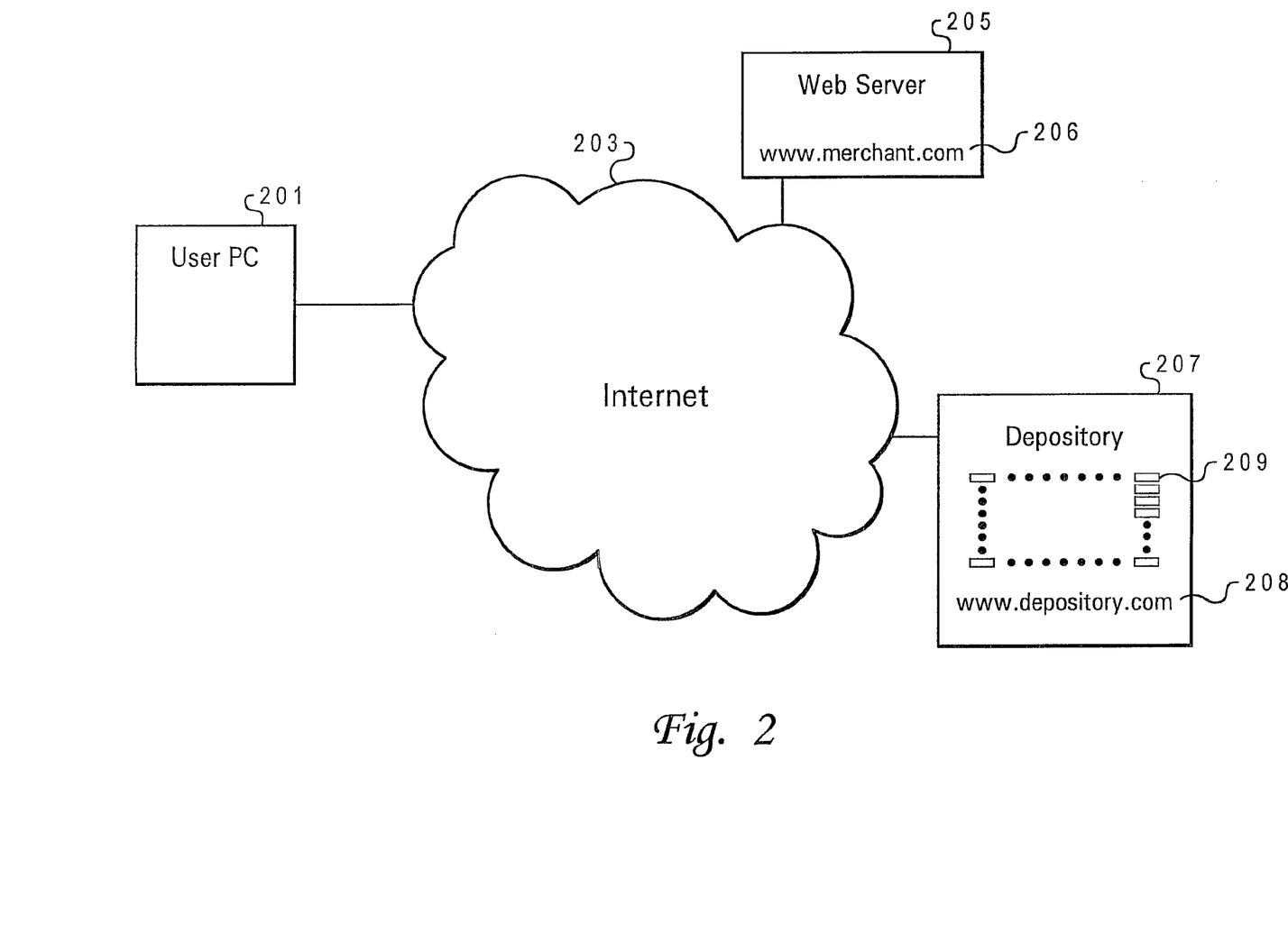
FIG. 2 is a high-level block diagram of a distributed data network in accordance with one embodiment of the present invention.

Also coupled to CPU are various devices, including modem 92, and network adapter 90, utilized for connecting data processing system 20 to other systems and/or networks, such as is illustrated in FIG. 2. CD-ROM 78, modem 92, and network adapter 90 are depicted as external components; however those skilled in the art are familiar with the various structures of data processing system architecture and understand that these components may be housed inside of system unit 22.

Modem 92 is a communication device that enables a computer to transmit information over standard telephone lines or wireless connections such as cellular. Modem 92 converts digital computer signals to interlock signals suitable for communications over these telephone media. Modem 92 can be utilized to connect data processing system 20 to a web server via remote access protocols. Modem 92 may also provide a connection to other sources, such as an electronic bulletin board (BBS) or the World Wide Web.

Referring now to FIG. 2, there is depicted a basic representation of a distributed data network, such as the Internet. Internet 203 is network cloud with connection Q to userPC 201 (i.e. the buyer's terminal), merchant web server 205, and depository 207. Web server 205 is typically a data processing system having a database, OS, and server software. UserPC 201 is also typically a data processing system with OS and web browser software stored locally in memory for accessing sites on Internet 203. UserPC 201 is utilized by a buyer to access Internet 203 and conduct transactions with web server 205. Each node at which a connection to Internet 203 is made has a corresponding Internet Protocol (IP) address and universal resource location (URL). Communication within the Internet may be handled via Transmission Control Protocol/Internet Protocol (TCP/IP) or other transfer protocol, which allows information to be transmitted to and from addresses assigned to each node. Use of URLs, for example, are common in modern networks. For example, web server 205 is made accessible to the users of the Internet via a web address, www.merchant.com 206. Depository 207 also has a corresponding URL, www.depository.com 208. Those skilled in the art appreciate that Internet 203 as illustrated herein may in fact be represented as an even more complex network of servers and with multiple buyers simultaneously accessing these servers to conduct E-commerce transactions.

A. Ensuring Integrity of Transactions

In a preferred embodiment, depository 207 is a data processing system having a data warehouse (e.g., hard drive) designed to store multiple documents 209 and provide later access to these documents 209. The hard drive is controlled with program code which includes a file protection subroutine. The file protection subroutine provides a write-once, read-many access permission to the hard drive. Thus, millions of documents 209 generated during commercial transactions on Internet 203 may be initially written to the hard drive. Once the document 209 has been stored, it is made accessible to the transacting parties only for the purpose of reading the content. A single readable copy remains resident on the hard drive and a copy may be provided to the party who requests to view the document 209. Although not illustrated, depository 207 may also be equipped with input mechanisms and visual output mechanism, such as a monitor, by which a depository administrator may manage the hard drive.

One preferred embodiment of the invention ensures that an E-commerce contract between buyer and seller remains unaltered after the agreement. The invention provides an electronic depository for depositing the contract after it has been created. Thus, at the conclusion of the E-commerce transaction, the contract is deposited in a third party depository via the Internet. The contract depository vouchsafes that the parties to the contract agreed to the terms of the contract. Further, the contract document cannot be modified unilaterally because the depository is designed to not allow such alterations as described above. In case of later disputes the buyer, seller, arbitrator or judge can review the contract easily by accessing the third party depository over the Internet utilizing an assigned document identifier.

Transmittal of the contract to a depository occurs as a result of a prior selection by the seller or buyer to utilize the depository during all E-commerce transactions. In one embodiment, the depository is an independent service made available to E-commerce servers (and/or clients). The E-commerce server subscribes to the depository, and the E-commerce server's program code which handles its transactions is modified. This modification allows it to instantaneously link to the depository and transmit a document to the depository when a transaction is completed. Thus, all electronic documents generated during E-commerce transactions made on the E-commerce server are instantaneously forwarded to the depository. Alternatively, the depository may be made available for subscription by the clients who wish to protect their transactions.

The depository may be managed by a system manager. Stored documents may be time-limited (i.e., stored for only a given period of time, such as 6 months.). Each stored document is provided with a reference number or identifier (ID) by which the client and/or merchant may later access and view the document.

Figure 3:
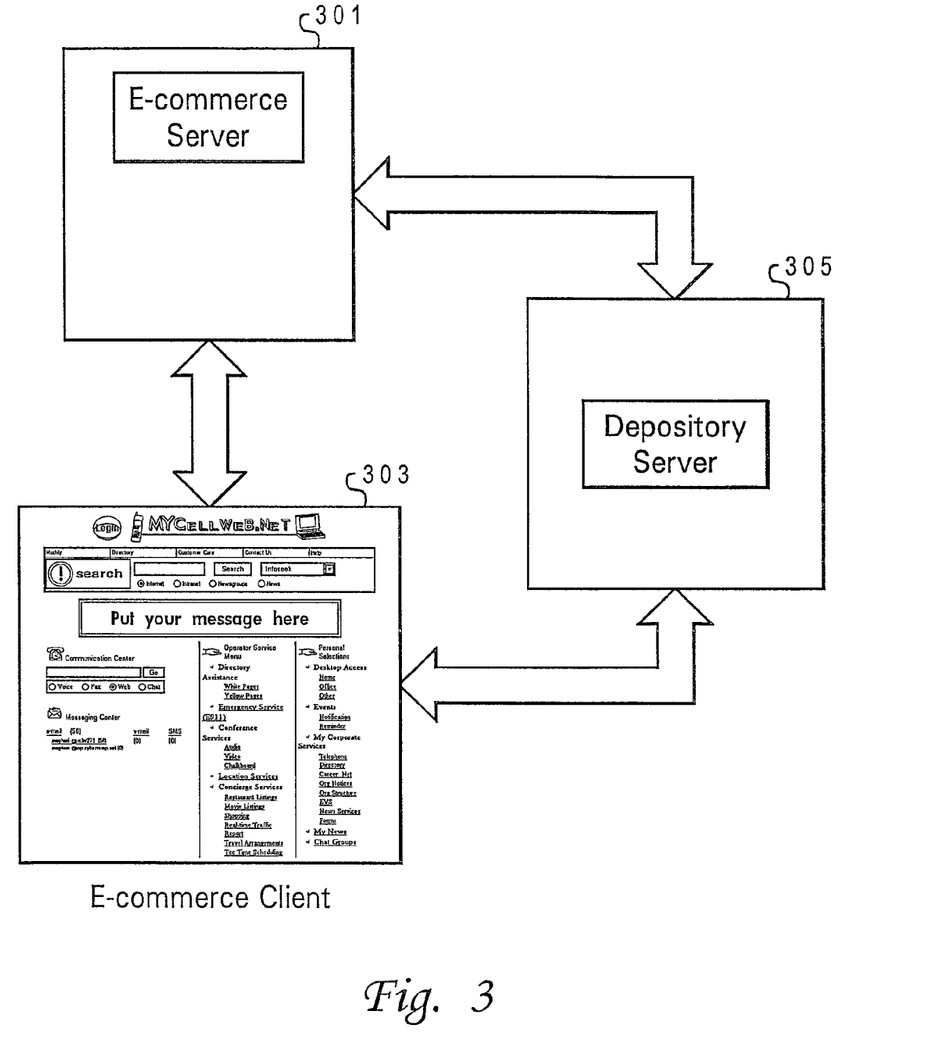
FIG. 3 is a high-level block diagram illustrating a client-server-depository network structure in accordance with one preferred embodiment of the present invention.

Turning now to FIG. 3, there is illustrated a different representation of a client-sever-depository configuration according to a preferred embodiment. E-commerce server 301 represents the merchant in this description. E-commerce server 301 communicates with E-commerce client (buyer) 303 via a connection over the Internet (not shown). Both components are in turn capable of communicating with depository 305.

Figure 4:
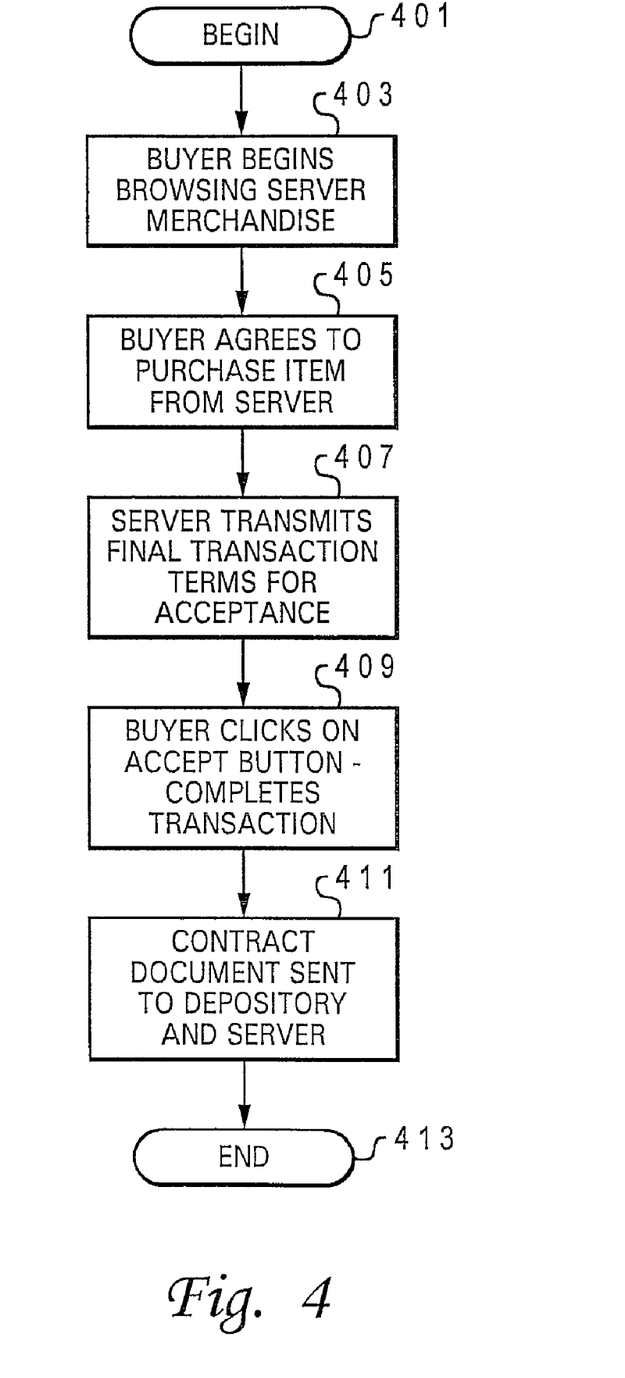
FIG. 4 is a high level logical flow chart depicting the process of a preferred implementation of the present invention.

FIG. 4 illustrates a process by which a document is sent to a depository during a commercial transaction. The process begins at block 401. An E-commerce buyer 303 shops at an E-commerce server 301 at block 403. The buyer 303 enters into a transaction in which he agrees to purchase an item from the server 301 at block 405. Server 301 then sends a final electronic sale agreement (contract) to the buyer 203 at block 407. If the contract terms are acceptable, the buyer 203 clicks on the accept button to accept the contract at block 409. Once the buyer 303 clicks on the accept button, the contract is immediately transmitted to depository server 305 at block 411. The contract is simultaneously sent back to server 301 to confirm the buyer's acceptance. The process then ends at block 413.

Figure 8A:
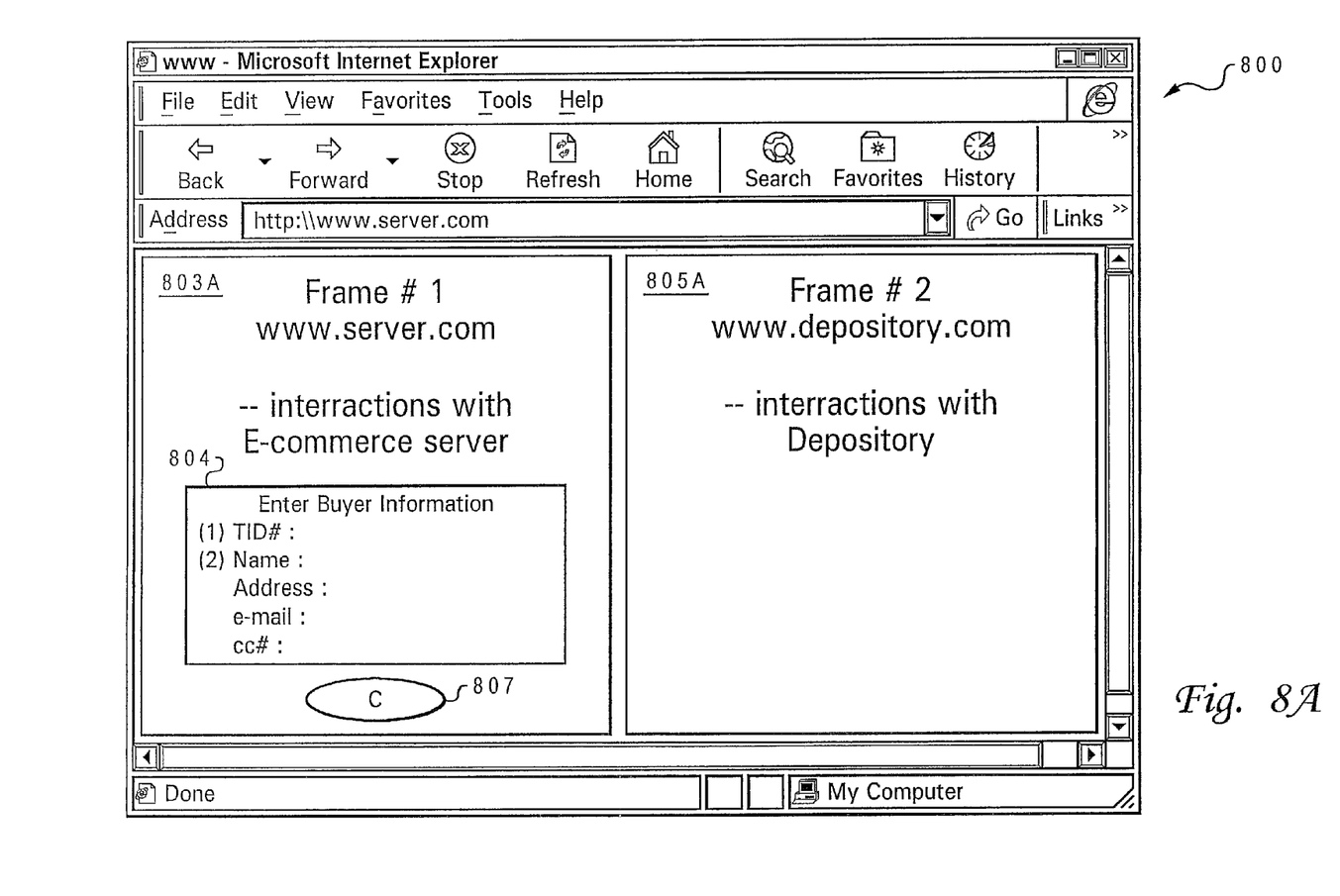
FIGS. 8A and 8B depict the client graphical user interface during an E-commerce transaction in accordance with one embodiment of the present invention.
Figure 8B:
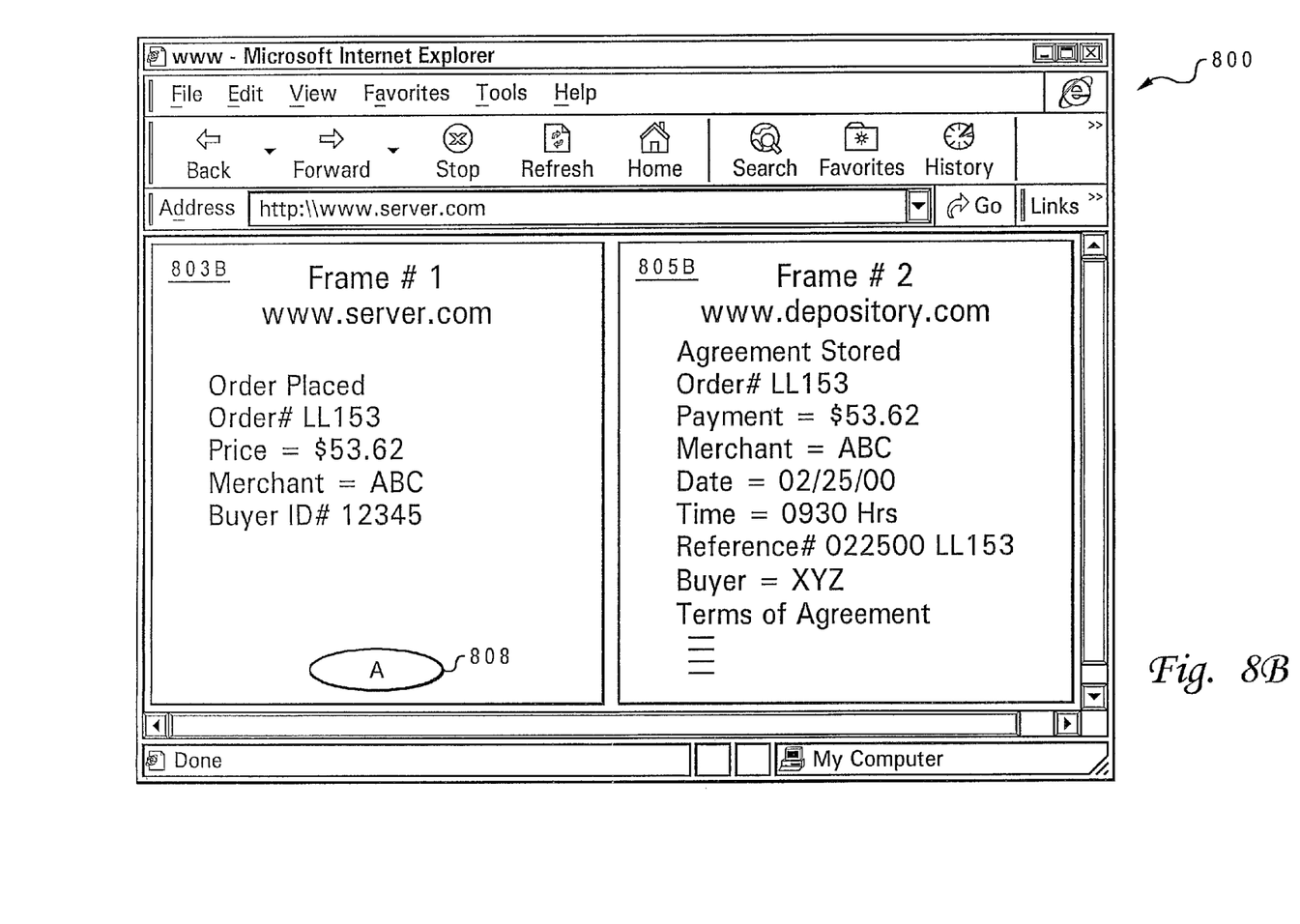

FIGS. 8A and 8B are graphical representations of a web browser utilized by a buyer during an E-commerce transaction according to one embodiment of the invention. Web browser 800 is created with software code stored on the local client system and includes program subroutines for enabling a split screen representation as illustrated. First frame 803 is the buyer's connecting portal to the web site of the E-commerce server. At first frame 803A, the buyer views the seller's merchandise/products and enters into a negotiation for the purchase of a selected item. Second frame 805A is the buyer's portal to the depository. In the preferred embodiment, when the buyer completes his transaction on first frame 803A and selects the accept button 807 on the transaction screen, the transaction request is sent to the seller and also the agreement is transferred to the depository. Relevant information concerning the transaction is simultaneously mirrored in second frame 805B. By this method, the agreement is recorded instantaneously with the completion of the transaction. The first frame 803B then briefly mirrors the transaction information and returns to the beginning of the transaction page for a new transaction. In a person to person transaction, both parties may have similar split-screens, so that the saved agreement is available to both parties for viewing while the transaction is being completed. The reference number/ID is instantaneously assigned and transmitted to both parties when a document is received for storage as illustrated in second frame 805B of FIG. 8B. In most application of the invention, the transactions will not be person to person as the server side transactions are generally automatic.

B. Privacy of Persons Entering into E-Commerce Transactions

In another embodiment, the third party contract depository described above is adapted to provide enhanced privacy and security during E-commerce transactions. The depository executes registration code that stores personal "information", including financial information, and provides each subscriber with a transaction ID (TID) and password. The TID is utilized by the subscriber to enter transactions over the Internet without revealing his/her personal information. The depository further executes transaction code by which the E-commerce transactions are completed. Limited access to the personal information is provided to the subscriber by the assigned password; however, no access is provided to the second party to a transaction except for payment information such as a credit card number. In one embodiment, the depository is controlled by the credit card company utilized in the transactions.

In traditional E-commerce transactions, products are typically sent from the merchant to the buyer using independent commercial shipping agencies (shippers) such as the United States Postal Service, United Parcel Service (UPS), Federal Express, etc. For example, many companies, which transact on-line, utilize UPS to ship their products. UPS sends its trucks to the company's physical site and picks up the products. Unlike the traditional pick-up, where the product is labeled with to the buyer's name and address, a security routing ID (SRID) is utilized in the invention. UPS is provided with a security routing ID along with the name and address of the buyer, which it places on the packages based on the SRID. In this manner, the buyer's personal information (e.g., name and address) is only placed on the product once it has reached the shipper, and the seller is never provided with this personal information.

Figure 5A:
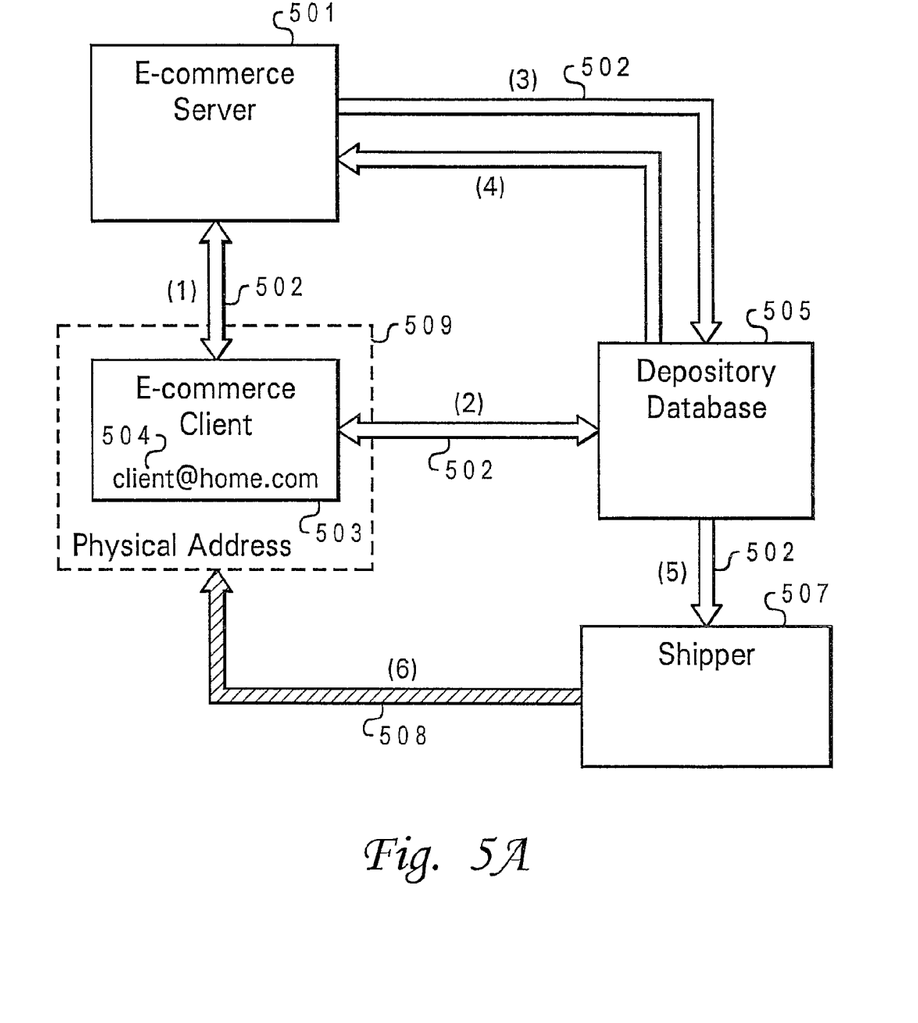
FIG. 5A is a high-level block diagram illustrating a client-server-depository network structure, which ensures privacy of buyers in accordance with another preferred embodiment of the present invention.

Referring now to FIG. 5A, a block diagram representation of a second preferred embodiment of the invention is illustrated wherein privacy of a buyer is maintained during a commercial transaction. E-Commerce buyer 503 is linked via the Internet to E-commerce server 501. Connecting arrows indicate the direction of flow of information during an E-commerce transaction. Both client 503 and server 501 are linked to depository (database) 505. Depository 505 is in turn linked to a shipper 507, who is responsible for shipping the products sold by server 501 to client 503. Shipper 507 delivers the products purchased during an E-commerce transaction to physical address 509 of client 503 via physical delivery route 508.

Figure 5B:
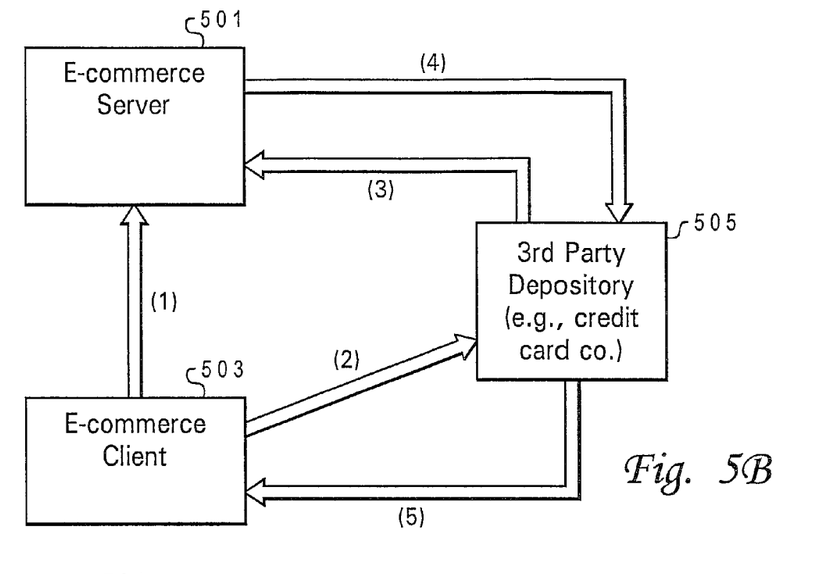
FIG. 5B is a high-level block diagram illustrating a client-server-depository network structure, which ensures privacy of buyers during purchase of an electronic product in accordance with another preferred embodiment of the present invention.

In another embodiment, illustrated in FIG. 5B, an electronic product (such as downloadable software or e-books) is purchased by client 503. The physical delivery route 508 and physical address 509 of FIG. 5A may not be required. Instead, connection via the Internet with the buyer's electronic (e.g., e-mail) address 504 is utilized, or alternatively, direct download to a storage location of a buyer's computer system is utilized. In FIGS. 5A, and 5B, the numbers on the arrows show the progression of the entire transaction as discussed in FIGS. 6A and 6B below.

Figure 6A:
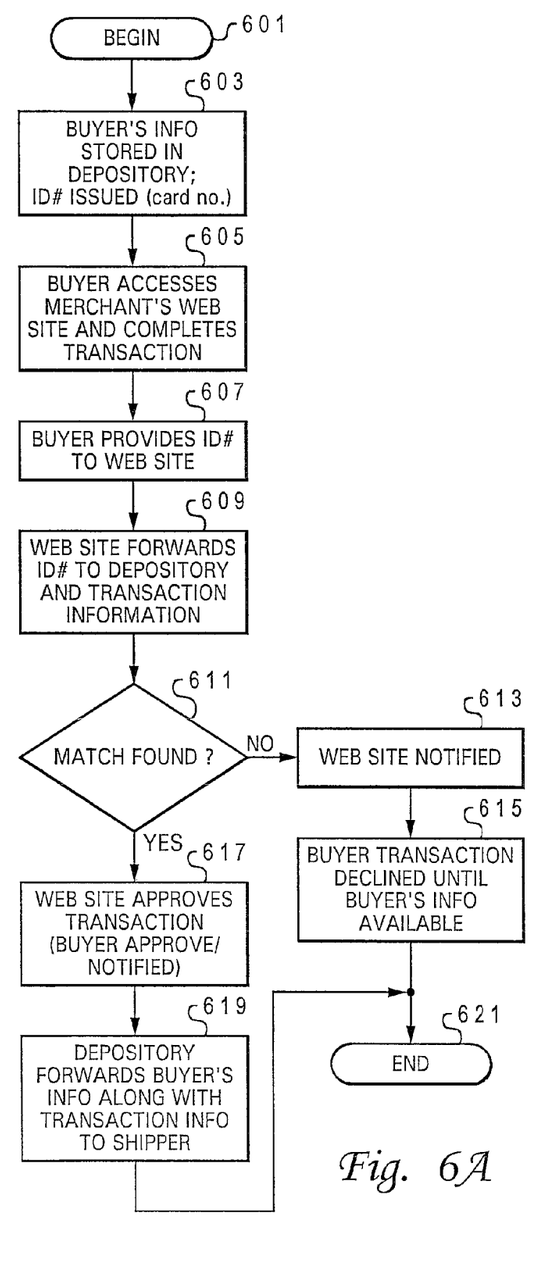
FIG. 6A is a high level logical flow chart depicting the process of ensuring privacy of buyers in accordance with a preferred implementation of the present invention.

FIG. 6A illustrates the process by which personal information required to complete a commercial transaction is provided only to a third party (i.e., not the merchant). The process begins at block 601. Prior to the transaction, the buyer's personal information is stored in the depository and the buyer is issued a transaction identifier (TID) at block 603. The buyer then accesses the merchant's web site and begins the transaction at block 605. During the transaction, the buyer selects the method by which he wishes to identify himself, (i.e., the buyer may wish to enter all his personal information into the web site if he is not concerned with privacy and/or security or he may choose to provide only his TID if he is concerned with privacy or security). Entering of personal information tends to be time consuming and regular on-line shoppers may utilize the functionality of the invention to reduce transaction time. In the preferred method of the invention, the buyer identifies himself to the seller only by his TID at block 607. When the transaction is completed, the E-commerce server forwards the buyer's TID to the depository at block 609. A check is made for the TID within the depository at block 611. If the TID is found (i.e., valid), then the transaction is approved and the buyer is sent an email or other message notifying him that his TID has been utilized at block 617. The E-commerce server is sent the SRID number and payment (e.g., credit card number) by the depository. The depository then forwards the buyer's personal information (i.e., physical address, etc.) along with the sellers information and SRID to the shipper at block 619. The E-commerce server alerts its warehouse/shipping personnel to prepare the product for pick-up by the shipper based on the SRID number. The SRID number is therefore provided to all parties involved (i.e., the buyer, web server, shipper and depository) to identify the transaction and related product. The process then ends at block 621.

If the TID is not found within the depository at block 611, the web server is notified at block 613. The web server then declines the transaction until a correct TID is provided or the buyer provides the information required in some other way at block 615. The process then ends at block 621.

Although the process has been outlined utilizing the above process blocks, those skilled in the art will appreciate that other process blocks could have been included within the scope of the invention and those depicted are for illustration only. For example, process block 619 may be followed by a process block at which the shipper transmits the product (electronically or physically) to the buyer before the process ends. Also, another process block may have been included in which the depository optionally contacts, via instant messaging, the buyer to obtain verification of the transaction from the buyer.

Figure 6B:
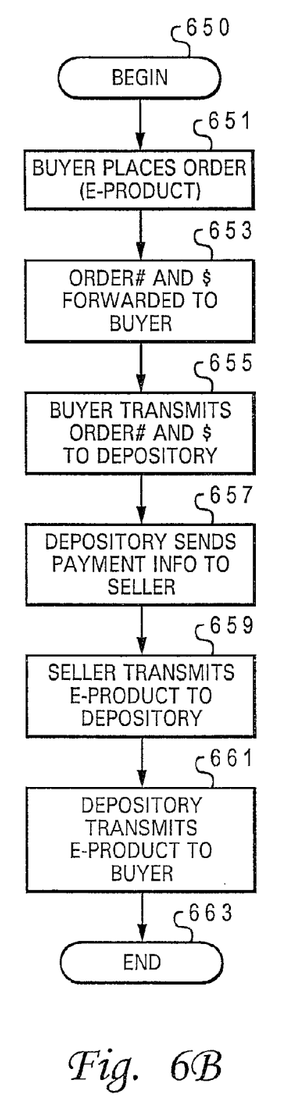
FIG. 6B is a high level logical flow chart depicting the process of ensuring privacy of buyers for electronic products in accordance with a preferred implementation of the present invention.

The above process is now revisited for transactions involving electronic products (i.e., not physical products that have to be physically shipped) and with reference the FIGS. 5B and 6B. The process begins at block 650. The buyer places an order for an electronic product (E-product (e.g., an E-book or software)) at block 651. Once the order is placed, an order number and price is assigned to the transaction at block 653. The communication application of the buyer's computer system then automatically transmits the order number and price to the third party depository at block 655. Upon receiving the transaction information, the third party depository sends the payment amount to the E-commerce server along with the order number at block 657. The E-commerce server transmits the E-product to the third party depository at block 659. Finally, the third party depository transmits the E-product to the buyer at block 661. The process then ends at block 663. The order number is attached to each of the above electronic transmittals to track the buyer and respective seller. In one embodiment, the order number has a seller's identifying information so that it is easily found in a database lookup at the depository.

In an alternative embodiment, the server may directly send the electronic product to the buyer once payment is received at block 657; however this permits the seller to have the buyer's email address, which may not be desired.

Figure 8C:
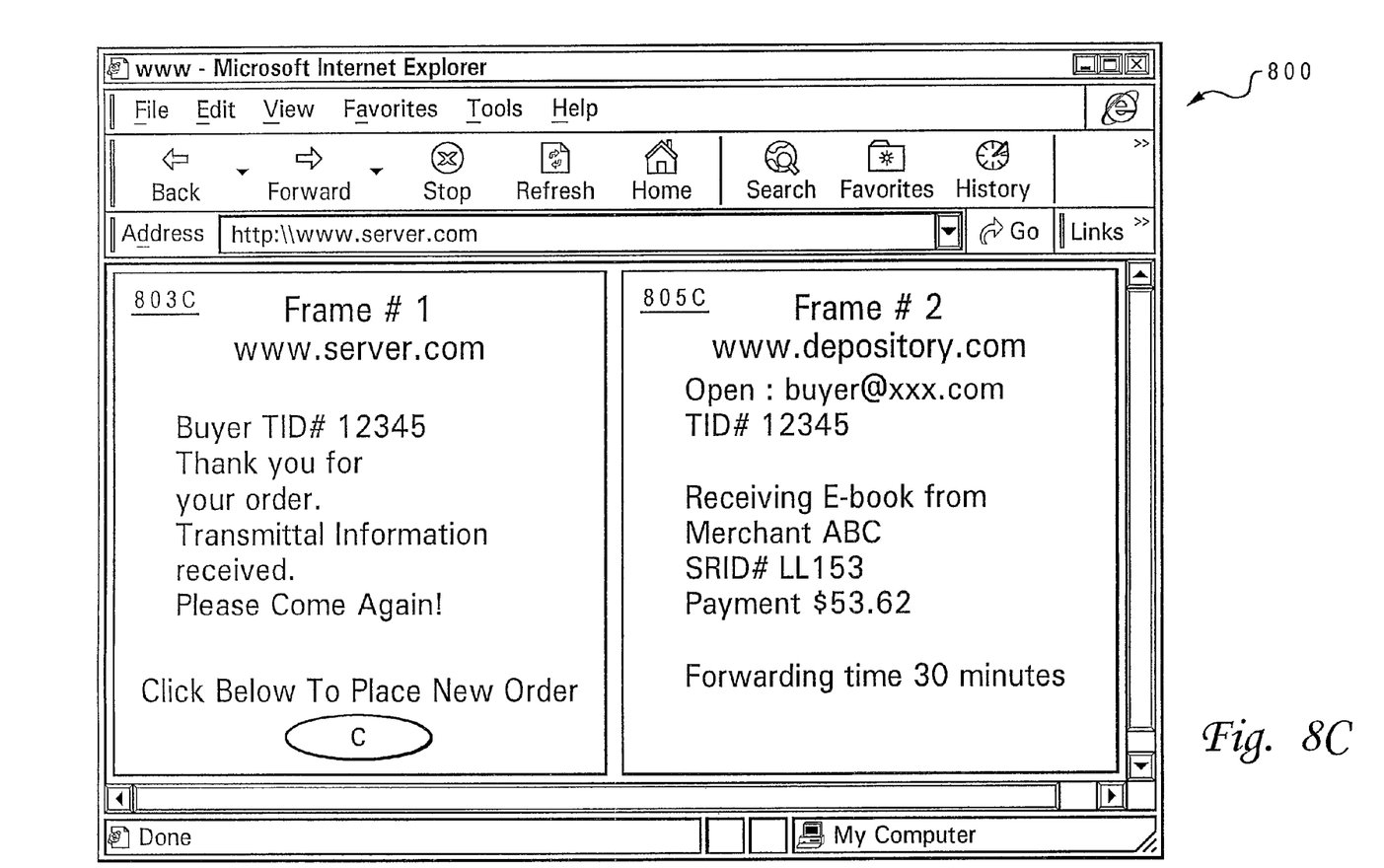
FIG. 8C depicts the client graphical user interface during an E-commerce transaction where privacy of the buyer is maintained in accordance with one embodiment of the present invention.

FIG. 8C illustrates a graphical user interface (web browser) within which a user may complete an anonymous E-commerce transaction. The layout of FIG. 8C has been described above with reference to FIGS. 8A and 8B. Also illustrated in FIG. 8A is a buyer information box 804 in which a buyer may elect to enter his TID number to preserve his anonymity or alternatively to enter his personal information. Once a TID number is entered, the process of utilizing the depository to complete the transaction is initiated. In FIG. 8C, first frame 803C has a transaction completion page displayed in which a buyer's TID is shown as having been entered. Second frame 805C illustrates transaction information at the depository based on a transfer of an electronic product from seller to depository utilizing the SRID number and buyer's TID number.

A more specific example is now presented. In this example, third party depository is controlled by a credit card company. The credit card company provides the service of managing the delivery of purchased products from an E-commerce transaction concluded with the buyer's issued credit card number and the TID. The buyer provides the credit card company with his e-mail address and/or physical mailing address when he obtains the credit card and corresponding card number. When the buyer buys from an electronic merchant, he provides the merchant with only his TID number. In case of a purchase of an electronic product, the merchant sends the electronic product with the TID number to the credit card company and the credit card company forwards the electronic content to the buyer and the required payment to the merchant.

In case of physical delivery of merchandise to a physical address, the merchant sends to the credit card company (1) the TID number, (2) the corresponding SRID number (which could be the same as the credit card transaction authorization confirmation number received from the credit card company), and (3) the name of the shipping agent. The credit card company links the address field for the buyer and the corresponding SRID number and forward these to the shipping agent.

The merchant provides the SRTD number on the package to be delivered, and the shipping agent attaches the physical address obtained from the credit card company. Hence, the seller is never provided with the buyer's shipping address (or name), thereby ensuring anonymity. This process also ensures that the package is shipped only to the buyer's shipping address provided to the credit card company, which allows for added security. Accordingly, privacy of the buyer is substantially improved and/or maintained with the exception of his credit card number. Security is enhanced as the credit card issuer can ensure that the product is delivered to the appropriate person and the appropriate physical or electronic address.

Figure 7A:
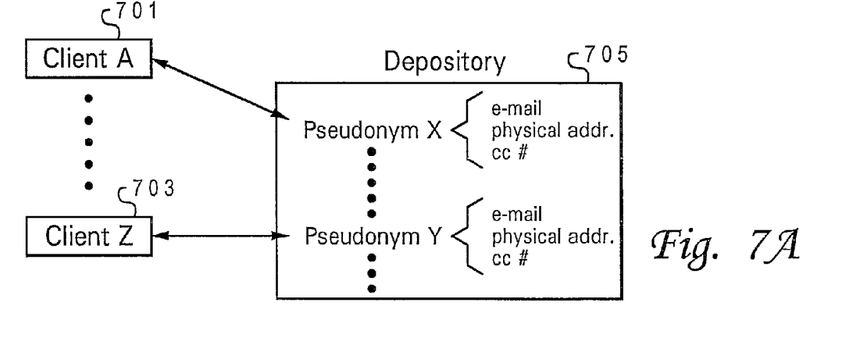
FIGS. 7A and 7B illustrates two methods of ensuring privacy of both parties to a transaction in accordance with one embodiment of the present invention.

An extension of the above embodiment operates to provide a 2-party anonymous transaction (i.e., both parties maintain confidentiality). In FIG. 7A, client A 701 and client Z 703 are each assigned a unique TID, X and Y, respectively. The unique TID is linked within the depository 705 to the user's name, e-mail address, physical address and credit card number. Depository 705 is utilized as a transaction proxy. Client A 701 advertises merchandise on depository 705 with his TID. Client Z 703 substantially may access the depository 705 and purchase the merchandise utilizing his TID. The depository 705 forwards the payment to client A 701 and ships the product to client Z 703.

Figure 7B:
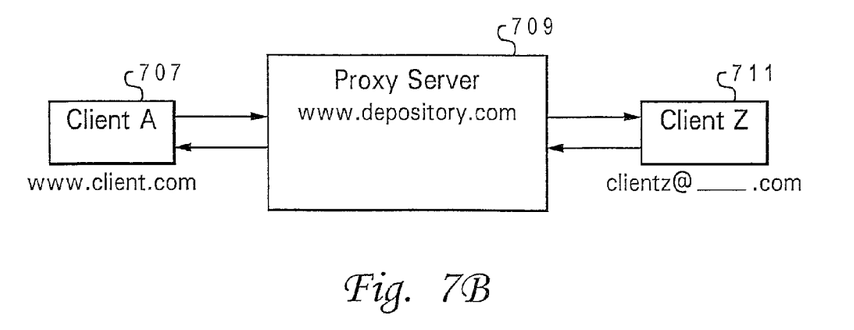

FIG. 7B illustrates the use of the third party depository 709 as a proxy server. Use of the third party depository 709 as a proxy server operates to protect the personal information of both the seller web server, client A 707 as well as the buyer, client Z 711. Thus each party is assigned a pseudonym or TID and transact through the depository via the pseudonyms. In this way, the buyer 711 does not have access to the name and address of the owner of the server 707 via the server databases established by Network Solutions, for example.

Some of the advantages of the use of a third party depository include:
1. The use of a depository is much more understandable to unsophisticated users as it does not involve digital signatures, which are complex and prone to fraud;
2. The use of a depository eliminates the associated overhead and recurring yearly costs of certifying digital signatures, which is high for individual buyers;
3. Storage of a contract in a third party depository (particularly if it is for a few months for a merchandise purchase) is very cheap as disk space is expensive; and
4. In contested transactions a single sheet agreement on terms and price that is maintained in a third party depository is very beneficial in establishing the true terms of the agreement.

It is important to note that while the present invention has been described in the context of a fully functional data processing system, those skilled in the art will appreciate that certain elements of the method of the present invention are capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention. For example, although the invention has been explained with reference to protecting the personal information of the buying party, it is conceivable that the invention may be applied to transactions where the selling party desires his personal information be protected.

What is claimed is:

1. A system for maintaining confidentiality of personal information during E-commerce transactions, said system comprising:
    an electronic depository utilized for storing a profile of personal information for at least a first party to an E-commerce transaction;

a server affiliated with said depository and having a processor that executes program code for:
  a registration utility for assigning said first party a unique transaction identifier (TID) linked to said profile for use during said E-commerce transaction; and
  a transaction process for completing said E-commerce transactions utilizing said electronic depository in response to said first party providing said transaction identifier to a second party to said E-commerce transaction, wherein said second party receives only a portion of said personal information of said first party required to complete the transaction;
wherein, when said transactions requires a transfer of an item from the second party to the first party, said transaction process further includes program code that is executed by the processor to complete the functions of:
  assigning a security routing identifier (SRID) for utilization by said second party to identify a shipment of said item by a shipping service affiliated with said electronic depository, wherein the shipping service is independent of said second party and is utilized to complete said transfer of said item to an address of said first party, and wherein said SRID is initially provided to the second party, who forwards the item along with said SRID and said TID;
  receiving said transaction identifier along with said security routing identifier at said depository; and
  forwarding at least an address portion of said profile associated with said TID to said shipping service along with said SRID, wherein said shipping service receives the item from said second party tagged with only said SRID and said TID for identification purposes and subsequently sends said item to said first party utilizing at least said address portion of the profile.

2. The system of claim 1, wherein said first party is a buyer and said second party is a merchant having a web server for initiating E-commerce transactions, and said transaction process includes program code executing on the server for locating said transaction identifier in said electronic depository.

3. The system of claim 2, wherein said program code for receiving includes program code executed by the processor of the server for automatically notifying said buyer party of a receipt of said transaction information.

4. The system of claim 2, wherein said product for said transaction is electronic and said program code for receiving further includes program code executed by the processor of the server for electronically receiving said product at said depository and then transmitting said product to said buyer.

5. The system of claim 1, wherein said program code of said registration utility which provides a unique transaction identifier comprises program code executed by the processor of the server for providing a credit card number.

6. The system of claim 2, wherein said second party is provided a unique second-party TID, said transaction utility further comprising program code executing on the processor of the server for completing said E-commerce transaction on a server of said electronic depository wherein said transaction is completed on said server without said first party and said second party receiving any of said personal information of the other party.

* * * * *